United States Patent [19]

Ebinuma

[11] Patent Number: 5,261,490
[45] Date of Patent: Nov. 16, 1993

[54] METHOD FOR DUMPING AND DISPOSING OF CARBON DIOXIDE GAS AND APPARATUS THEREFOR

[75] Inventor: Takao Ebinuma, Kawasaki, Japan

[73] Assignee: NKK Corporation, Tokyo, Japan

[21] Appl. No.: 846,290

[22] Filed: Mar. 3, 1992

[30] Foreign Application Priority Data

| Mar. 18, 1991 | [JP] | Japan | 3-052473 |
| Mar. 18, 1991 | [JP] | Japan | 3-052476 |
| Jul. 19, 1991 | [JP] | Japan | 3-179945 |

[51] Int. Cl.$^5$ .................. E21B 36/00; E21B 43/24; E21B 43/40
[52] U.S. Cl. .................. 166/266; 166/267; 166/272; 166/302; 166/52; 166/57
[58] Field of Search .............. 405/53, 59, 128; 588/250; 166/265, 266, 267, 271, 272, 302, 366, 369, 371, 52, 57, 901

[56] References Cited

U.S. PATENT DOCUMENTS

| 3,627,047 | 12/1971 | Wilson et al. | 166/302 |
| 3,926,259 | 12/1975 | Perkins | 166/302 |
| 4,007,787 | 2/1977 | Cottle | 166/267 |
| 4,147,456 | 4/1979 | Klass | 405/53 X |
| 4,235,607 | 11/1980 | Kinder et al. | 166/267 X |
| 4,424,858 | 1/1984 | Elliot et al. | 166/265 X |
| 4,424,866 | 1/1984 | McGuire | 166/371 X |
| 4,632,601 | 12/1986 | Kuwada | 405/53 X |
| 5,025,860 | 6/1991 | Mandrin | 166/267 |

FOREIGN PATENT DOCUMENTS

| 408979 | 1/1991 | European Pat. Off. | 405/128 |
| 463663 | 11/1992 | European Pat. Off. | 588/250 |
| 57-172094 | 10/1982 | Japan. | |
| 2-80316 | 3/1990 | Japan. | |
| 2-133308 | 5/1990 | Japan. | |

OTHER PUBLICATIONS

Technology for Counting the Increase of Temperatures of the Atmosphere on the Earth, Edited by Section of Special Study on Environment of the Earth, The Institute of Pollution Resources, OHM, Co. Ltd., pp. 200-213, 1990 (Pub: Japan).

Gieslewicz, W. J., "Some Technical Problems and Developments in Soviet Petroleum and Gas Production", *The Mines Magazine*, Nov. 1971, pp. 12-16.

Japanese Scientific Magazine, Kagaku Asahi, vol. 12, 132-133, 1990 (Pub: Japan).

(List continued on next page.)

*Primary Examiner*—George A. Suchfield
*Attorney, Agent, or Firm*—Frishauf, Holtz, Goodman & Woodward

[57] ABSTRACT

A method for dumping carbon dioxide gas into the ground of the sea bottom comprises injecting carbon dioxide gas into the ground of the sea bottom to fix the carbon dioxide gas in the ground of the sea bottom. A method for dumping carbon dioxide gas into the ground of permafrost regions comprises boring a well and injecting carbon dioxide into the ground to fix carbon dioxide in the ground. A method for recovering and consuming natural gas found in the ground of permafrost regions with low pollution comprises exploiting and consuming hydrate of natural gas present in permafrost regions to produce carbon dioxide as a by-product and injecting the carbon dioxide by-product into the ground of permafrost. A method for gathering natural gas by using dumped carbon dioxide gas as a heat generating source comprises injecting carbon dioxide gas or liquefied carbon dioxide gas into layers of hydrate of natural gas present in the ground of the sea bottom or in permafrost regions. An apparatus for gathering natural gas by using carbon dioxide gas as a heat generating source comprises an injection pipe for injecting carbon dioxide, a pressure injection apparatus for injecting carbon dioxide, a gathering pipe for gathering a mixed gas containing natural gas separated from the layers of hydrate of natural gas and carbon dioxide and a gas separator for separating natural gas from the gathered mixed gas.

13 Claims, 13 Drawing Sheets

OTHER PUBLICATIONS

Cold Regions Science and Technology, Elsevier Science Publishers B.V., Amsterdam (Printed in the Netherlands) vol. 14, (1987) 107-119.

Cathrate Hydrate in Water—A Comprehensive Treatise, C. W. Davidson, vol. 2, ed. F. Franks. Plumum Press, 1972 (Pub: Japan).

Nature and occurrence of gas hydrate and their implications to geologic phenomena: Journal of geographical society of Japan, (Pub: Japan), vol. 93, 597-615, 1987.

Role of methane clathrates in past and future climate, Climate Change, G. J. MacDonald (Pub: U.S.A.), vol. 16, 247-281, 1990.

The future of methane as an energy resource, G. J. MacDonald, vol. 15, 53-83, 1990 (Pub: U.S.A.).

A system study for the removal, recovery and disposal of carbon dioxide from fossil fuel power plants in the U.S., M. Steinberg et al., Rep. Brookhaven National Laboratory, BNL 35666 (Pub: U.S.A.).

METHOD FOR DUMPING AND DISPOSING OF CARBON DIOXIDE GAS AND APPARATUS THEREFOR

BACKGROUND OF THE INVENTION

1. Field of the Invention

The present invention relates to a method for dumping and disposing of carbon dioxide gas and an apparatus therefor, and more particularly to a method for dumping and disposing of carbon dioxide gas exhausted from industrial furnaces and an apparatus therefor.

2. Description of the Related Art

Since carbon dioxide gas exhausted from various sorts of industrial furnaces such as furnaces in thermal power plants has increased the temperature of the atmosphere on the earth in recent years, it becomes a great problem for mankind to prevent the temperature of the atmosphere from rising. As a method for preventing the temperature of the atmosphere on the earth from rising, a method for dumping carbon dioxide gas has recently been disclosed.

A method for dumping carbon dioxide in some places other than in the atmosphere to prevent temperatures on the earth from rising involves dumping carbon dioxide separated from gases exhausted from thermal power plants and the like into the ocean, disused oil wells, dead pits of rock salt or the like. This method is shown in "A system study for the removal, recovery and disposal of carbon dioxide from fossil fuel power plants in the U.S." (M. Steinberg et al., Rep. Brookheaven National Laboratory, BNL 35666).

Dumped carbon dioxide cannot be permanently fixed to a place, where the carbon dioxide is dumped, by using the method for dumping carbon dioxide into the ocean, dead pits or the like.

Japanese Patent Application Laid Open No. 80316/90 discloses a method for dumping carbon dioxide gas into the ocean. The method involves dumping carbon dioxide gas to a depth of more than 700 m under the sea surface where it is dissolved in seawater upto a saturated concentration. In this system, advantage is taken of the fact that an amount of dissolved carbon dioxide gas in the ocean has not attained a saturated value, and of the fact that the amount of dissolved carbon dioxide gas in the seawater at the depths of the ocean is small.

When carbon dioxide gas is just dumped into the ocean to be dissolved in seawater, a problem arises concerning the dissolving rate of carbon dioxide gas in seawater. The dissolving rate of carbon dioxide gas decreases with an increase of the concentration of carbon dioxide gas which is dissolved in the seawater. The concentration of carbon dioxide gas is a ratio of an amount of dissolved carbon dioxide gas to the saturated amount of dissolved carbon dioxide gas. The concentration of carbon dioxide gas adjacent to where carbon dioxide gas is dumped, that is, adjacent to where an apparatus for injecting carbon dioxide gas is located, increases as a result of the carbon dioxide gas being injected into seawater. The dissolving rate of carbon dioxide gas therefore decreases with the lapse of time during which the apparatus for injecting carbon dioxide gas operates. Accordingly, the apparatus for injecting carbon dioxide gas is preferably installed at a place where the tide runs strong so that carbon dioxide can be dumped into "fresh" seawater having a low concentration of dissolved carbon dioxide gas. However, since the tide at the depths of the sea, which is considered favorable for dumping carbon dioxide gas, runs weak, the aforementioned method has a problem in that the dissolving rate of carbon dioxide gas becomes lower with the lapse of time during which the apparatus for injecting carbon dioxide gas operates.

It is feared that dumping of carbon dioxide into the ocean has a bad influence on oceanic life and gives rise to destruction of oceanic environment. Japanese Patent Application Laid Open No. 133308/90 discloses methods for decreasing the bad influence on the environment of a sea area, into which the carbon dioxide gas is dumped. One of the method described in this publication is a method wherein a pressure vessel is filled up with liquefied carbon dioxide gas to be dumped and the pressure vessel is dropped into the sea. Another method disclosed in the publication is a method wherein an empty vessel is buried at the bottom of the sea and then filled with liquefied carbon dioxide gas.

The method wherein a pressure vessel filled up with carbon dioxide is dropped into the ocean and wherein carbon dioxide gas is pumped into a vessel buried at the bottom of the sea are not appropriate for measures to counter pollution wherein a great amount of exhaust gas must be disposed of.

A method for dumping carbon dioxide gas, which is disclosed in Japanese scientific magazine "Kagaku Asahi" (Vol. 12, 132–133, 1990), involves dumping liquefied carbon dioxide gas to a depth of more than 3000 m under the sea surface where a water pressure is more than about 30 MPa. At this pressure, the density of the liquefied carbon dioxide gas becomes larger than that of the seawater and it is anticipated therefore that the liquefied carbon dioxide gas will accumulate in depressions of the sea bottom, and that any seawater, into which the carbon dioxide gas has dissolved, will spread or creep over the sea bottom to be neutralized at places where calcium carbonate has accumulated. The reaction is expressed as follows:

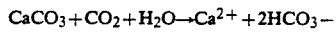

$$CaCO_3 + CO_2 + H_2O \rightarrow Ca^{2+} + 2HCO_3^-$$

The method disclosed in the magazine relies on gas hydrate formation at a contact area where an upper portion of layers of liquefied carbon dioxide gas accumulated in depression of the sea contacts the seawater; a gas hydrate is a solid like ice. The gas hydrate is represented by the molecular formula: $CO_2 \cdot nH_2O$. The gas hydrate can act as a cover to contain and prevent liquefied carbon dioxide gas from dispersing.

The gas hydrate is a solid wherein water molecules from polyhedra called "host structure" and a gas molecule is included as "guest molecule" in each of the polyhedra. This sort of clathrate hydrate and simply a clathrate as well as the gas hydrate. Hereinafter, this compound is referred to as the gas hydrate. It depends on temperature, pressure and concentration of impurities whether the gas hydrate exists stably or not. Minimum pressures necessary for the stable existence of the gas hydrate have been already made clear as a function of temperature by numerous studies. Results on many sorts of gas hydrates as well as the gas hydrates of carbon dioxide are shown, for example, in "Clathrate Hydrate in Water—A Comprehensive Treatise" (D. W. Davidson, Vol. 2 ed F. Franks, Plenum Press, 1972). Stabilities of gas hydrate will be shown later in this document.

Even if carbon dioxide is dumped into the seawater at depths below 3000 m, the dumped carbon dioxide is released again into the atmosphere because of the following seawater current on a global scale. The current flows toward the equator from a polar region at a bottom layer of the ocean and ascends at an equator area. Therefore the seawater containing dumped carbon dioxide should appear at the sea surface around the equator. Because the solubility of carbon dioxide into the seawater decreases with an increase of temperature, it is supposed that the super-saturation is attained at the sea surface, which results in the release of carbon dioxide contained in the atmosphere because of the dumping of carbon dioxide into the atmosphere.

Furthermore, the dumping of carbon dioxide into the deep sea must be carried out by passing the carbon dioxide through a steel pipe at high pressures of more than 30 MPa, which requires an enormous cost.

It should be noted that it is for making the density of liquefied carbon dioxide gas greater than that of seawater that the pressure at a great depth of the sea is required, but such great pressure is required not to liquefy carbon dioxide gas or to form the gas hydrate. For example, the pressure necessary for liquefying carbon dioxide gas and the pressure necessary for forming the gas hydrate are about 4 MPa and about 2.3 MPa respectively, when the temperature of the seawater is 5° C. This is an order of magnitude less than is required by the method described in "Kagaku Asahi" (Vol. 12, 132–133, 1990) discussed above.

To see the relation between the depth of the sea and the existing conditions of carbon dioxide, representative vertical distribution of temperatures of seawater and a phase diagram of carbon dioxide overlapping each other are shown in FIG. 5. In FIG. 5, curve A, B and C denote the vertical distribution of temperatures of seawater, the saturated vapor pressure of carbon dioxide and the dissociation pressure of the gas hydrate, respectively. From the saturated vapor pressure of curve B and the dissociation pressure of the gas hydrate of curve C, it can be seen that the depth at which the condition necessary for liquefying carbon dioxide or for forming the gas hydrate occur is about 400 m.

It is well known that the gas hydrate is formed not only by carbon dioxide, but also by natural gas. In addition to dumping carbon dioxide, the present invention provides a means whereby the dumping of carbon dioxide can be used for recovery of natural gas from a layer of natural gas hydrate in nature. Scientific and technical papers related to the natural gas hydrate is therefore reviewed in the next place.

FIG. 13 is a graphical representation showing the relation between the temperature and the dissociation pressure of the gas hydrate relative to methane being major component of natural gas; the dissociation pressure of carbon dioxide is also shown in the figure to compare both hydrates. In the drawing, curve (a) denotes an equilibrium relation among carbon dioxide gas, hydrate of carbon dioxide gas and water or ice and curve (b) shows an equilibrium relation among liquefied carbon dioxide gas, carbon dioxide gas and hydrate of carbon dioxide gas, that is the saturated vapor pressure as a function of the temperature. Curve (c) denotes an equilibrium relation among methane gas, methane gas hydrate and water or ice. Dissociation pressures of methane hydrate and carbon dioxide at 0° C. are 2.6 MPa and 1.2 MPa, respectively. When the pressure is elevated, both hydrates are stably present even at temperatures greater than 0° C.; the dissociation pressures of methane hydrate and carbon dioxide are 6.9 MPa and 4.5 MPa at 10° C., respectively. In the case of carbon dioxide, liquefied carbon dioxide gas and the gas hydrate can coexist. On the other hand, since the critical temperature of methane is low ($-82.2°$ C.), methane gas hydrate can coexist with only methane gas at temperatures from $-10°$ to $+12°$ C. shown in FIG. 13.

There is a substantial amount of the natural gas hydrate in the natural world. According to Kamath et al., it is confirmed that the natural gas hydrate exists not only in the oil field regions along the coast of the Gulf of Mexico, but also in the permafrost regions and oil field regions along the coasts of Alaska, Canada and Siberia (see e.g. "Cold Regions Science and Technology", Vol. 14, 107–119, 1987).

It is not a long ago that the existence of the natural gas hydrate was found in the natural world. According to Ryo Matsumoto, the natural gas hydrate was found for the first time in the permafrost regions of Siberia in 1970. This is shown in his paper "Nature and occurrence of gas hydrate and their implications to geologic phenomena", (Journal of geological society of Japan, Vol. 93, 597–615, 1987). It is presumed that an enormous volume of natural gas hydrate is present under ground 200 to 1000 meters deep from the earth's surface. In 1980, the natural gas hydrate was recovered in large quantities in Blake Outer Ridge off Florida according to "Deep Sea Drilling Project". It was understood according to this project that a boundary between a layer of the natural gas hydrate and soil could be clearly distinguished by means of seismic exploration. Thereafter, this boundary was confirmed throughout the world. It is conceivable from this that an enormous volume of the natural gas hydrate is present under ground at the sea bottom.

The natural gas hydrate has a great possibility as an energy resource. According to an estimate of reserves of the natural gas hydrate, $1.1 \times 10^4$ giga tons of the natural gas hydrate exist underground at the sea bottom and $4 \times 10^2$ giga tons under ground of permafrost regions as a mass of carbon contained in the natural gas hydrate. This is shown in "Role of methane clathrates in past and future climate, Climate Change", (G. J. Macdonald, Ann. Rev. Energy, Vol. 16, 247–281, 1990). An estimate that a total energy of reserves of the natural gas hydrate is five times larger than that of coal reserves is pointed out. This is shown in "The future of methane as an energy resource" (G. J. Macdonald, Vol. 15, 53–83, 1990).

A method for gathering natural gas from layers of the natural gas hydrate is disclosed in Japanese Patent Application Laid Open No. 172094/82. The method of this publication is illustrated in FIG. 12. As shown in FIG. 12, each of the lower ends 224, 224 (a) of pipe bodies 222 and 223 respectively, is penetrated into layers 225 of the natural gas hydrate. The upper ends 222 (a), 223 (a) are positioned above the surface 221 of the sea. Seawater is poured through an inlet port 226 into the pipe body 222 to outlet 224 (a) into the natural gas reservoir. The natural gas hydrate is heated by the seawater whereby natural gas 227 is separated from the hydrates. The natural gas 227 and seawater enter inlet 224 and rise through pipe body 223. The seawater is discharged from an outlet port 228 into the sea. The natural gas 227 rises through the pipe body 223 and is recovered by gas holder on the sea.

This method disclosed in the Japanese Patent Application Laid Open No. 172094/82 wherein gas is recovered by injecting seawater into layers of the natural gas hydrate has a difficulty in that this method cannot be executed in permafrost regions where there is no easy access to seawater or water.

SUMMARY OF THE INVENTION

It is an object of the present invention to provide a method for dumping and disposing carbon dioxide gas such as waste gas exhausted from industrial furnaces and an apparatus therefor.

To attain the aforementioned object, the present invention provides:

A method for dumping carbon dioxide gas into the ground of the sea bottom, comprising:

injecting carbon dioxide gas into the ground of the sea bottom to fix the carbon dioxide gas in the ground of the sea bottom.

A method for dumping carbon dioxide gas into the ground of a cold district of high latitude wherein there is permafrost, comprising:

boring a well in said cold district of high latitude; and injecting carbon dioxide into the ground in said cold district to fix carbon dioxide inside the ground in said cold district.

A method for recovering and consuming natural gas found in the ground of a cold district of high latitude having permafrost regions with low pollution, comprising:

exploiting and consuming hydrate an natural gas present in a permafrost region of said cold district of high latitude to produce carbon dioxide as a by-product; and injecting said carbon dioxide by-product into the ground of the permafrost of said cold district.

A method for gathering natural gas by using dumped carbon dioxide gas as a heat generating source, comprising:

injecting carbon dioxide gas or liquefied carbon dioxide gas into layers of hydrate of natural gas present in the ground of the sea bottom or in a permafrost region of a cold district under condition wherein the carbon dioxide will form a gas hydrate to produce sensible heat and latent heat and wherein said heat dissociates the natural gas from the hydrate and it is released for recovering.

An apparatus for gathering natural gas by using carbon dioxide gas as a heat generating source, comprising:

an injection pipe for injecting carbon dioxide, said pipe having an outlet operable to be disposed in or below layers of hydrate of natural gas;

a pressure injection apparatus for injecting carbon dioxide under pressure through said injection pipe and out of said outlet;

a gathering pipe for gathering a mixed gas containing natural gas separated from the layers of hydrate of natural gas and carbon dioxide; and a gas separator for separating natural gas from the gathered mixed gas.

The above objects and other objects and advantages of the present invention will become apparent from the following detailed description, taken in conjunction with the appended drawings.

DESCRIPTION OF THE PREFERRED EMBODIMENT

EXAMPLE 1

An example of dumping carbon dioxide gas into the ground of the sea bottom will now be described below.

Figure 1:
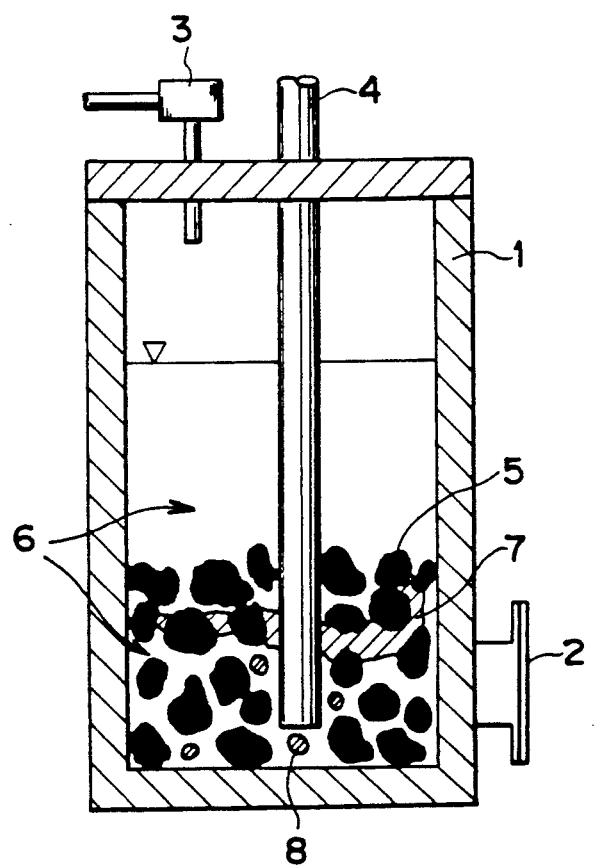
FIG. 1 is a schematic illustration showing a laboratory equipment used for demonstrating a method for dumping carbon dioxide gas to the sea bottom according to the present invention.

In FIG. 1, reference numeral 1 denotes a pressure vessel. An observation port 2, a pressure control valve 3 and a carbon dioxide injection pipe 4 are mounted on the pressure vessel 1. After the pressure vessel 1 is tightly filled up with earth and sand 5, seawater is injected into the pressure vessel 1. A pressure inside the pressure vessel 1 is kept constantly at 5 MPa (corresponding to a pressure of water at a depth of about 500 m) and a temperature of the whole apparatus is kept constantly at 5° C.

After it was confirmed through the observation port 2 that the seawater 6 had penetrated into the earth and sand 5, a predetermined amount of liquefied carbon dioxide gas 8 was fed into the earth and sand from the carbon dioxide injection pipe 4. When injected liquefied carbon dioxide gas 8 rises slowly toward the surface of the earth and sand, hydrate of carbon dioxide 7 was formed and solidified. In this test, carbon dioxide gas 8 was solidified without being exposed on the surface of the earth and sand 5. Therefore, it was confirmed that carbon dioxide could be dumped into the sea bottom without doing injury to life at the sea bottom.

A method for injecting carbon dioxide gas into the ground of the sea bottom to fix the carbon dioxide gas in the ground of the sea bottom will now be described with specific reference to FIGS. 2 to 4.

Figure 2:
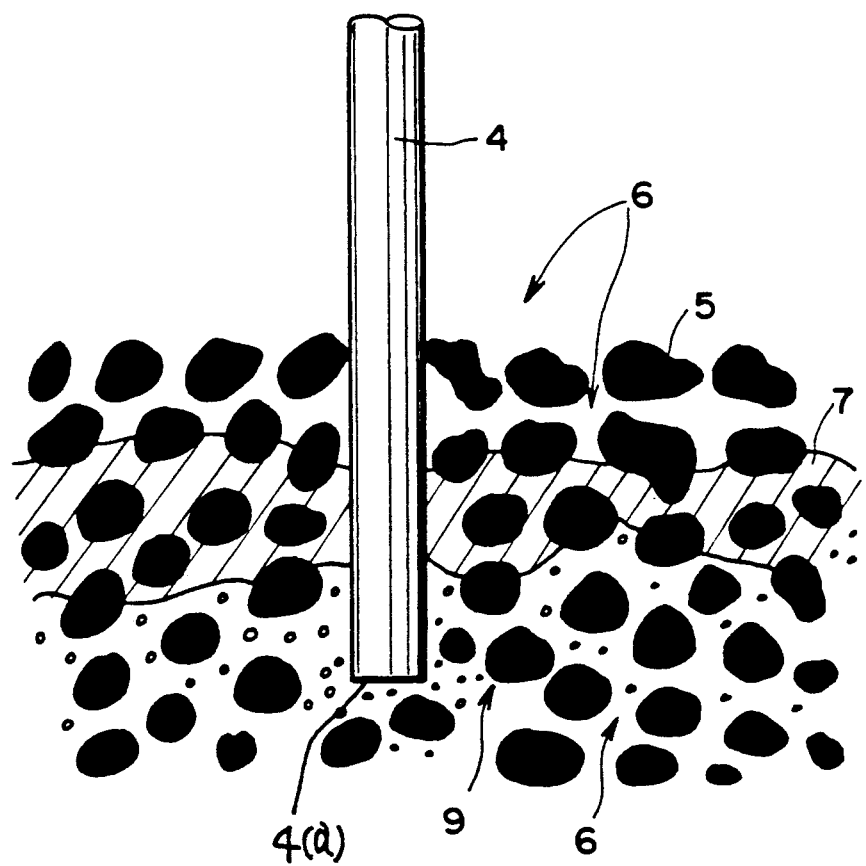
FIG. 2 is a schematic illustration showing a state ① of residence of carbon dioxide gas relative to the present invention.

① An example wherein carbon dioxide injected into the ground of the sea bottom is not liquefied and fixed as gas hydrate In this example, as shown in FIG. 2, carbon dioxide injected from a carbon dioxide gas injection pipe 4 is not liquefied. It mixes with seawater as carbon dioxide gas bubbles 9, whereby gas hydrate is formed. In this case, carbon dioxide gas is injected to a small depth of the ground at the sea bottom and gas hydrate 7 of carbon dioxide is caused to be formed in the ground. Since the gas hydrate of carbon dioxide 7 is a solid having a greater density than that of seawater, carbon dioxide gas 9 to be dumped into the ground of the sea bottom can be fixed and caused to reside in the ground at the sea bottom.

It is feared that an injection port for injecting carbon dioxide gas, namely, the outlet port 4 (a) of the carbon dioxide gas injection pipe 4 can be blocked by the gas hydrate of carbon dioxide 7. To prevent the outlet port from being blocked, it is sufficient to form or position the outlet port at a position deeper than where the layers of gas hydrate of carbon dioxide. The reason for this will now be described below.

Temperatures of the ground of the sea bottom rise with increase of the depth of the ground under the influence of geothermal energy. Accordingly, although the conditions of temperatures and pressures, under which the gas hydrate of carbon dioxide is formed near the surface of the ground of the sea bottom, are satisfied, hydrate of carbon dioxide cannot be formed in deep ground due to its excessive high temperatures.

If only the influence of pressures is taken into consideration, it would be expected that gas hydrate of carbon dioxide should be easily formed with an increase of the depth of the ground. However, when the influence of temperatures of the ground is quantitatively compared with the influence of pressures of the ground, the influence of temperatures is seen to prevail and gas hydrate is not formed. Thus positioning the carbon dioxide gas injection port deeper will prevent the carbon dioxide gas injection port from being blocked and carbon dioxide in the form of gas can be injected into the ground. After carbon dioxide gas injected into the ground has dispersed and rises to the vicinity of the surface of the ground, the carbon dioxide gas contacts seawater penetrated into the ground and forms the gas hydrate of carbon dioxide.

② An example wherein carbon dioxide injected into the ground of the sea bottom is fixed as liquefied gas or gas hydrate This example shows a case where carbon dioxide is dumped into the ground of the sea bottom having a depth great enough to liquefy carbon dioxide. The density of seawater is greater than the density of carbon dioxide at a depth of about 3000 meters or less. The density of seawater becomes less than the density of carbon dioxide at a depth of about 3000 meters or more.

Accordingly, when seawater penetrated into the ground of the sea bottom at a depth of less than 3000 meters is mixed with dumped liquefied carbon dioxide gas, light liquefied carbon dioxide gas can rise from the ground and go into seawater. As shown in FIG. 3, however, since gas hydrate 7 is formed when seawater 6 is mixed with liquefied carbon dioxide 8 within the range of those depths, the liquefied carbon dioxide gas is prevented by layers of the gas hydrate of carbon dioxide 7 from flowing into seawater. When it is taken into consideration that temperatures in the ground of the sea bottom rise with increase of the depth of the ground of the sea bottom, carbon dioxide is present in a liquefied form in a lower portion of its residence layers and in a form of gas hydarate of carbon dioxide in an upper portion of its residence layers. In this case, as described above, it is sufficient to position the carbon dioxide gas injection port sufficiently deep to prevent the injection port from being blocked by the gas hydrate of carbon dioxide.

③ An example wherein an impermeable layer is used

Figure 4:
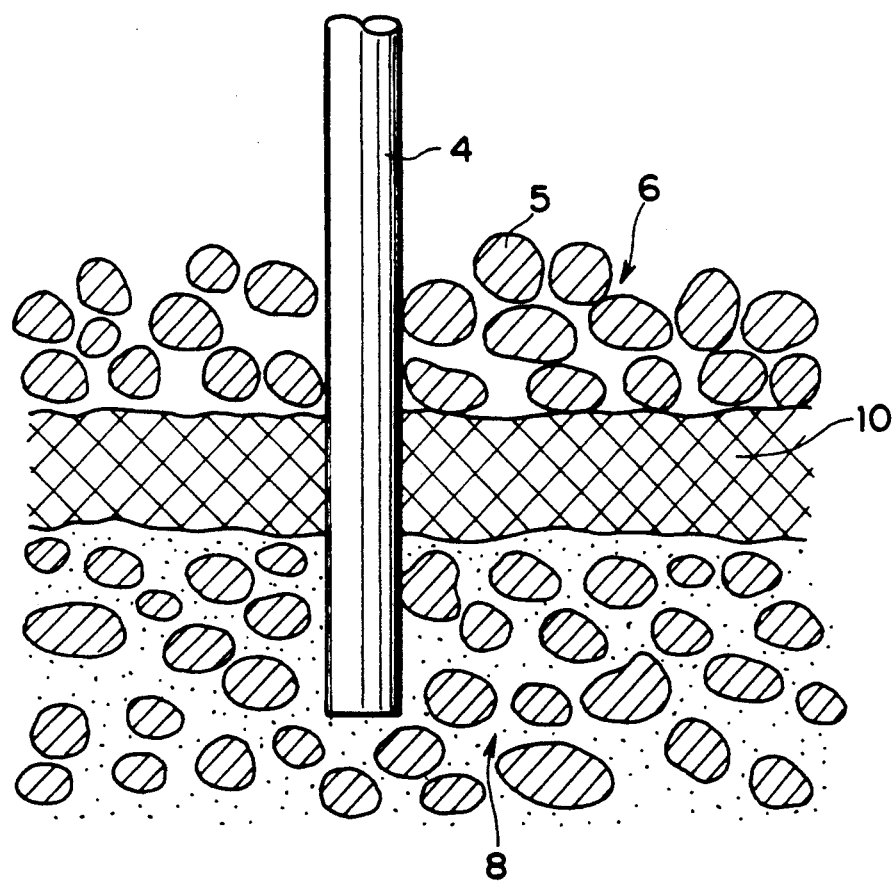
FIG. 4 is a schematic illustration showing a state ③ of residence of carbon dioxide gas relative to the present invention.

As shown in FIG. 4, in the case where there is an impermeable layer 10 in the ground of the sea bottom, the ground deeper than the impermeable layer 10 can be used as the residence layers of liquefied carbon dioxide gas 8 by boring the ground of the sea bottom to allow the carbon dioxide gas injection port 4a to be positioned deeper than the impermeable layer 10 by inserting the carbon dioxide gas injection pipe 4 through the impermeable layer in the ground of the sea bottom.

In the method for dumping carbon dioxide gas into the ground of the sea bottom, residence layers of liquefied carbon dioxide gas or gas hydrate are formed in the ground of the sea bottom by boring a well having a depth great enough to liquefy carbon dioxide gas or to form gas hydrate and by injecting carbon dioxide gas into the well under pressure, whereby carbon dioxide gas is fixed in the ground of the sea bottom.

Figure 5:
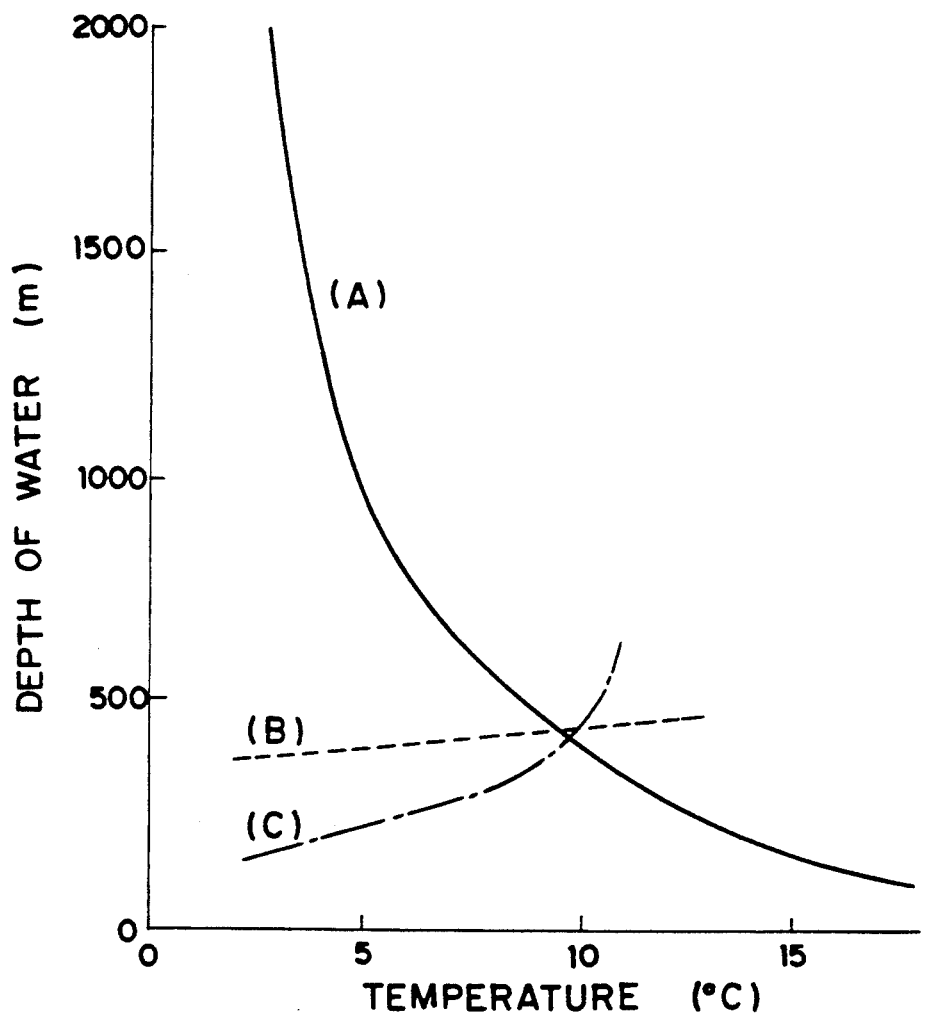
FIG. 5 is a graphical representation showing a state of carbon dioxide from the relationship between the depths of the sea and the temperatures of seawater relative to the present invention.

The method of the present invention is a method wherein residence layers of carbon dioxide gas are artificially made by injecting carbon dioxide gas into the ground under the sea, under moderate pressure similar to that used where hot water produced during generation of electrical energy by use of geothermal energy is returned to a well or a case where groundwater having been used for melting snow is returned into the ground or a case where groundwater is artificially cultivated for industrial use. The forms of carbon dioxide stored in those residence layers are not confined to the liquefied form, but include carbon dioxide in the form of a gas hydrate of carbon dioxide and in the form of a mixture of the gas hydrate of carbon dioxide and liquefied carbon dioxide gas depending on the conditions of temperatures and pressures in the layers of the residence thereof. FIG. 5 shows how the state of the residence layers of carbon dioxide is changed with increase of the depth of water. It is noted that the case where carbon dioxide gas is not liquefied and gas hydrate of carbon dioxide is not formed due to a low depths of water in a sea area where carbon dioxide is dumped, carbon dioxide disperses into the ocean. This is beyond the object of the present invention and is not part of the invention.

The state of the residence of carbon dioxide gas will now be described.

As shown in FIG. 2, an example is pointed out wherein carbon dioxide gas, which is injected into a small depth of the ground of the sea bottom, left not liquefied and remains in the form of carbon dioxide gas bubbles, forms gas hydrate 7 of carbon dioxide in the ground. In this case, since the gas hydrate of carbon dioxide is a solid having a density larger than that of seawater, carbon dioxide gas to be dumped into the ground of the sea bottom can be caused to reside stably in the ground.

Figure 3:
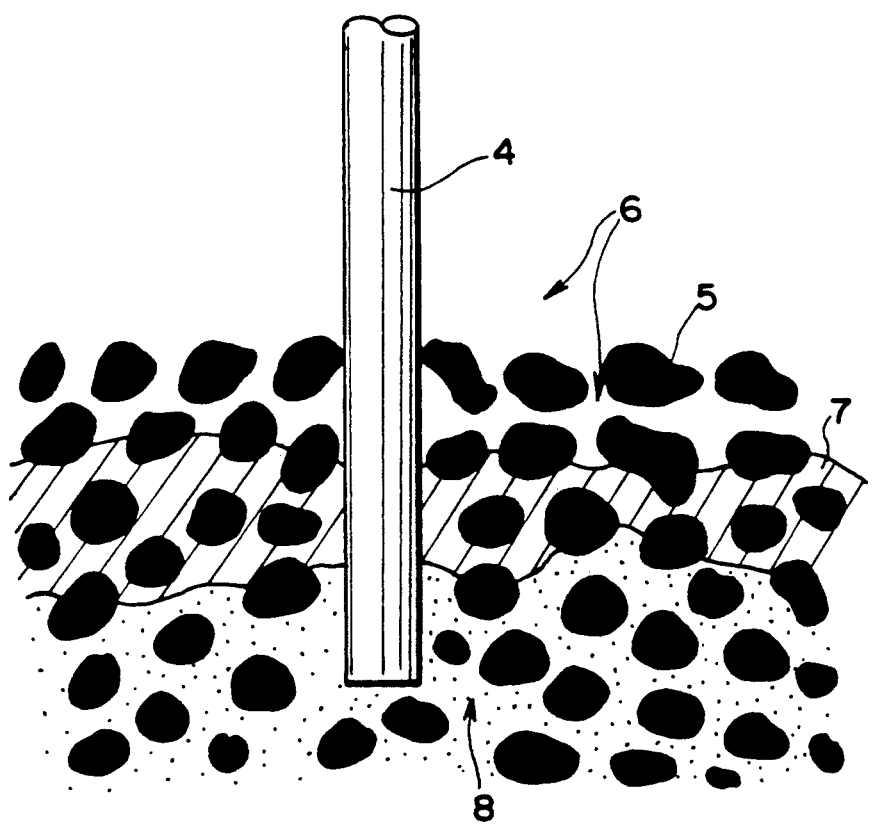
FIG. 3 is a schematic illustration showing a state ② of residence of carbon dioxide gas relative to the present invention.

As shown in FIG. 3, an example is pointed out wherein carbon dioxide gas injected into the ground of the sea bottom is fixed as liquefied carbon dioxide gas or gas hydrate of carbon dioxide. This example shows a case where carbon dioxide gas is dumped into the ground having a depth of water large enough to liquefy carbon dioxide gas. The density of seawater becomes less than the density of liquified carbon dioxide gas at a depth of about 3000 meters or more. According to FIG. 5, since gas hydrate of carbon dioxide 7 is formed when seawater is mixed with liquefied carbon dioxide gas at a depth of about 3000 meters or more, the liquefied carbon dioxide 8 cannot flow into seawater. Since the temperatures in the ground of the sea bottom rise with increase of the depth, carbon dioxide gas is present in the form of liquid in a lower portion of the residence layers of carbon dioxide gas and in the form of gas hydrate of carbon dioxide in an upper portion of the residence layers of carbon dioxide.

As shown in FIG. 4, in the case where an impermeable layer 10 is present in the ground of the sea bottom, the ground deeper than this impermeable layer 10 can be used as the residence layers of liquefied carbon dioxide gas 8.

As described above, according to the present invention, since carbon dioxide gas can be caused to reside as liquefied carbon dioxide gas, gas hydrate of carbon dioxide or a mixture of both liquefied carbon dioxide gas and gas hydrate of carbon dioxide, carbon dioxide is prevented from interacting with and causing injury to life near the sea bottom. Moreover, the present invention is effective in prevention of increase of temperatures of the earth due to escape of carbon dioxide into the atmosphere.

Example 2

An example wherein carbon dioxide gas is dumped in a cold district will now be described below.

Figure 6:
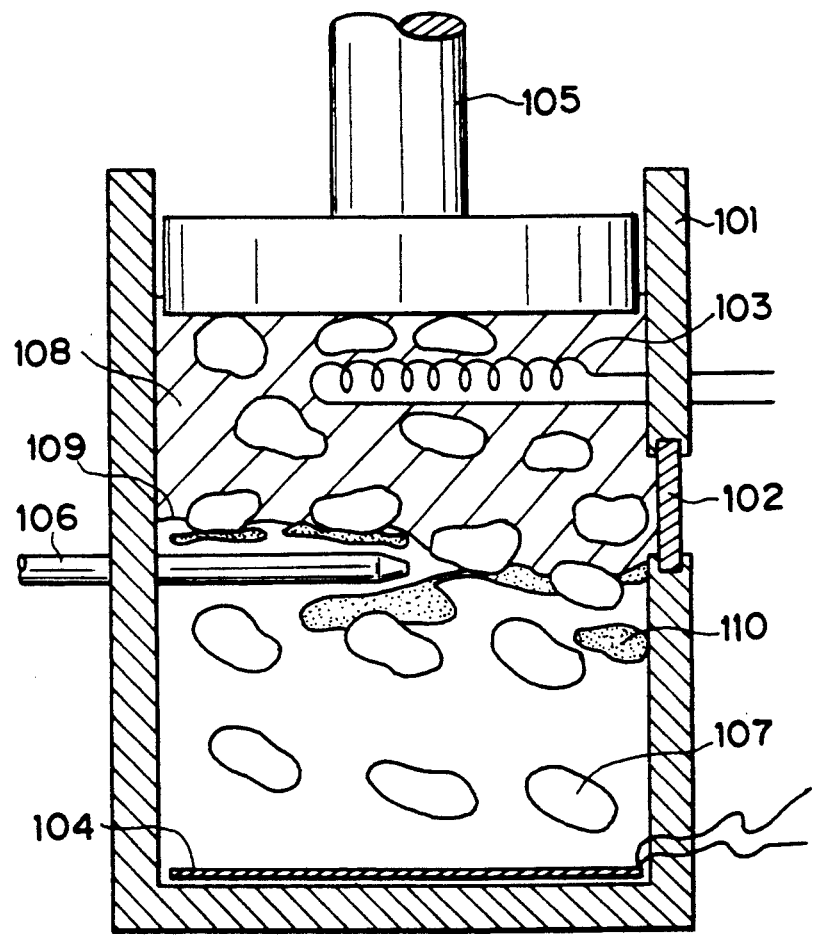
FIG. 6 is a schematic illustration showing a laboratory apparatus for demonstrating a method for dumping carbon dioxide in a cold district according to the present invention.

In FIG. 6, reference numeral 101 denotes a pressure vessel. An observation pressure tight glass port 102, a cooling heat exchanger 103, an electric heater 104, a pressure piston 105 and an injection pipe 106 for injecting water and carbon dioxide gas are mounted on the pressure vessel 101.

After the pressure vessel 101 has been filled up with soil particles 107 as earth and sand, water is injected into the pressure vessel 101 through the injection pipe 106 and water is caused to penetrate into the earth and sand. Then, temperatures of an upper face and a lower face of the earth and sand is kept at $-10°$ C. and $+10°$ C. respectively by means of the cooling heat exchanger 103 and the electric heater 104. The upper face of the earth and sand is frozen by a temperature gradient in a vertical direction in the earth and sand. After a frozen face 9 of the earth and sand has stopped to move downwardly, a pressure is applied to the entire earth and sand by using the pressure piston 105. In the test, a pressure of 4 MPa is applied to the entire earth and sand by using the pressure piston 105 to reproduce permafrost layers at a depth of about 400 m under the ground.

When carbon dioxide gas is injected from the injection pipe 106 positioned just under the frozen face 109 at a pressure of more than 4 MPa, water and carbon dioxide gas in layers not yet frozen contact each other and gas hydrate 110 of carbon dioxide of milk white color is formed in soil.

The method for dumping carbon dioxide as gas hydrate of carbon dioxide in permafrost regions will now be described below.

The simplest method for dumping carbon dioxide as a gas hydrate of carbon dioxide in permafrost regions is a method wherein a well is bored in permafrost regions and carbon dioxide gas is injected into a position deeper than a critical depth. Since geothermal energy increases with increase of the depth of the ground, there is a limit for the existence of gas hydrate of carbon dioxide. Therefore, the limit for the existence of gas hydrate of carbon dioxide is referred to as the critical depth.

It is in order to prevent an injection port from being blocked by gas hydrate of carbon dioxide to inject carbon dioxide into a position deeper than the critical depth. Carbon dioxide gas having been injected as gas or liquid into the ground converts to gas hydrate of carbon dioxide, reacting with groundwater after the carbon dioxide has dispersed upwardly and has attained the critical depth.

When a permafrost at a position where carbon dioxide gas is dumped is thick, carbon dioxide gas should be injected into layers of frozen soil. In this case, the frozen soil around the well is melted forming voids into which the carbon dioxide gas can be injected.

There are places where hydrate of natural gas is present in permafrost regions. In such regions, natural gas can be consumed by gathering hydrate of natural gas, and carbon dioxide gas generated in a process of consumption of natural gas can be dumped in the well where natural gas is gathered. In this case, the natural gas hydrate present in the permafrost is changed to gas hydrate of carbon dioxide. This method is convenient because it is unnecessary to bore a new well to dump carbon dioxide gas.

Liquefied carbon dioxide can be injected into the frozen soil instead of injecting carbon dioxide gas.

The method for dumping carbon dioxide in a cold district is a method wherein carbon dioxide gas is fixed by injecting carbon dioxide gas under pressure into the ground in a cold district of high latitude, which satisfies the conditions of temperatures and pressures, under which gas hydrate of carbon dioxide gas is present stably.

Figure 7:
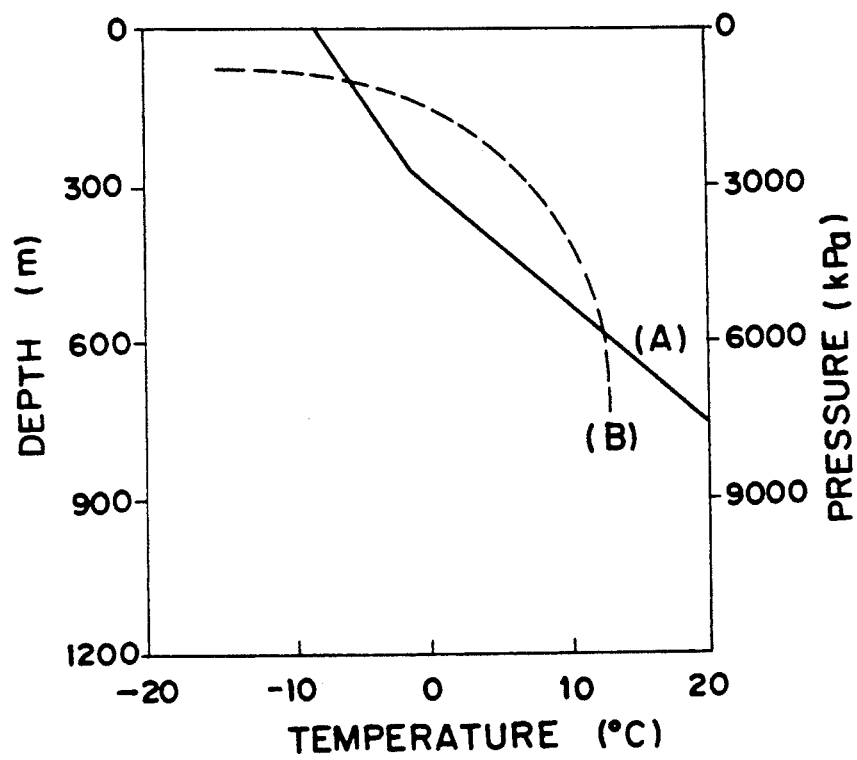
FIG. 7 is a graphical representation wherein an example of a vertical distribution of temperatures of the ground in a cold district overlaps a curve of dissociation pressure of gas hydrate of carbon dioxide relative to the present invention.

FIG. 7 is a graphical representation wherein an example of a vertical distribution of temperatures of the ground in a permafrost region is overlapped by a curve of dissociation pressures of gas hydrate of carbon dioxide. The example of a vertical distribution of temperatures of the ground in a permafrost region is shown in "Cold Regions Science and Technology" (Kamath et al., Vol. 14, 107-119, 1987). In the drawing, (A) denotes a curve of the vertical distribution of temperatures of the ground and (B) a curve of the dissociation pressures of gas hydrate of carbon dioxide. It is understood from FIG. 7 that gas hydrate of carbon dioxide is formed at the depths between 100 m and 600 m (the critical depth).

According to the present invention, since carbon dioxide gas is dumped and fixed as gas hydrate of carbon dioxide in a cold district of high latitude, there is no fear of spread of dumped carbon dioxide.

Example 3

An example wherein natural gas is gathered by injecting dumped carbon dioxide in the form of gas or liquid into layers of hydrate of natural gas will now be described below.

Figure 8:
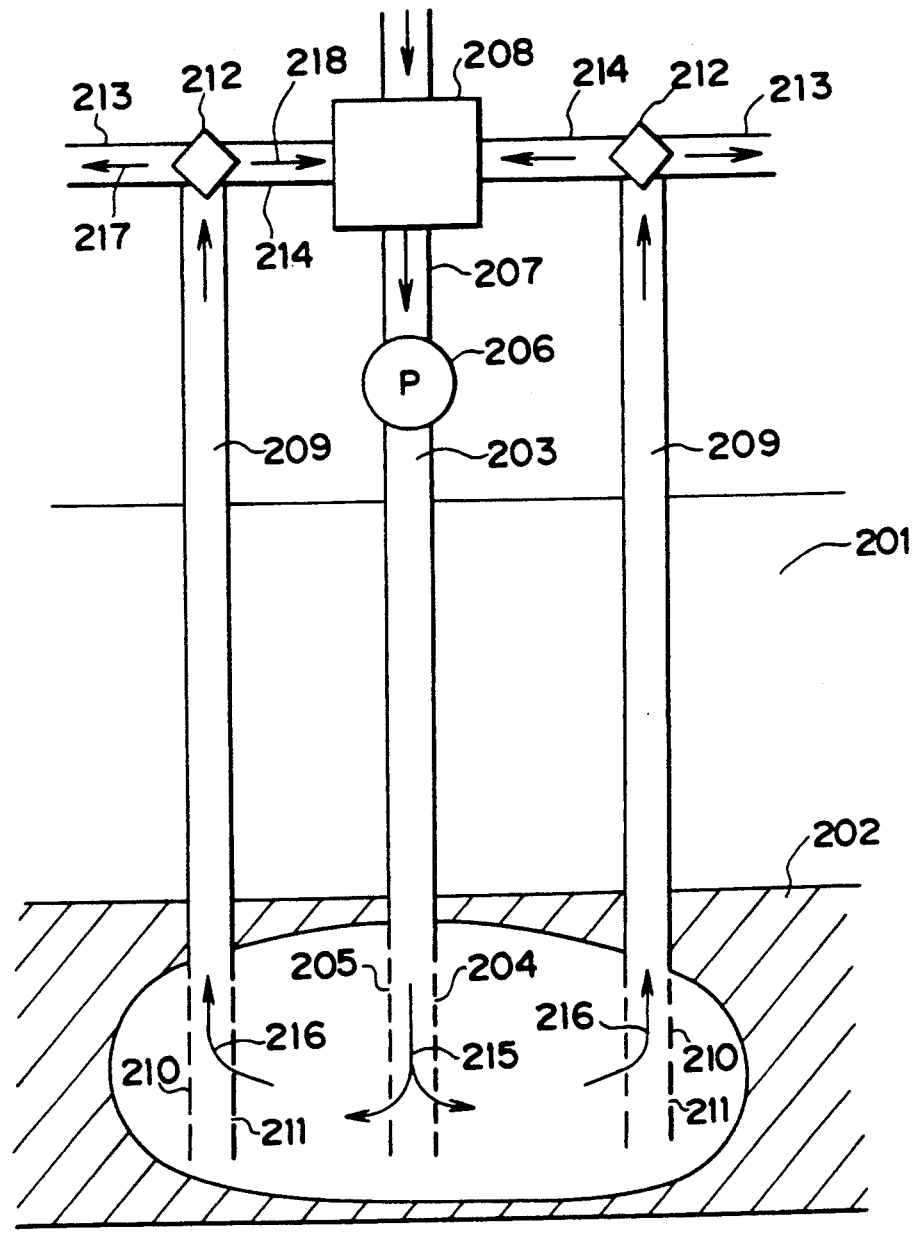
FIG. 8 is a schematic illustration showing a method for dumping carbon dioxide into layers of hydrate of natural gas and simultaneously gathering natural gas according to the present invention.

In FIG. 8, a pressure injection pipe 203 for injecting dumped carbon dioxide under pressure is arranged in layers 202 of hydrate of natural gas formed in the ground 201 of a permafrost region, penetrating the ground 201 and the lower portion of the pressure injection pipe 203 being caused to penetrate in the layers 202 of hydrate of natural gas. A number of exhaust ports 205 for exhausting dumped carbon dioxide gas, which is injected into a lower portion 204 of the pressure injection pipe, into the surroundings of the exhaust ports 205 are formed. A pressure injection apparatus 206 is connected to the pressure injection pipes 203 on the surface of the ground and to a storage tank 208 for storing dumped carbon dioxide via a suction pipe 207. When the form of the dumped carbon dioxide is gas, a gas compressor is used in the pressure injection apparatus 206. When the form of the dumped carbon dioxide is liquid, a high pressure pump is used in the pressure injection apparatus 206.

A gathering pipe 209 for gathering natural gas is arranged in the layers 202 of hydrate of natural gas, the lower portion of the gathering pipe 209 being caused to penetrate in the layers 202 of hydrate of natural gas. A number of gas inlet ports 211 are formed in a lower portion 210 of the gathering pipe 209. A gas separator 212 is connected to the gathering pipe 209 on the surface of the ground. Natural gas 217 separated by the gas separator 212 is transported to a gas holder (not shown) by means of a pipe 213. Separated carbon dioxide gas 218 is transported to the storage tank 208 for storing dumped carbon dioxide gas by means of a pipe 214. A gas separation film or a solvent such as amine or the like is used in the gas separator 212.

The technology for separation of carbon dioxide is already put to practical use. According to "Technology for countering the increase of temperatures of the atmosphere on the earth" (edited by Section of Special Study on Environment of the Earth, the Institute of Pollution Resources, OHM Co. Ltd., PP. 200 to 213, 1990), the technology for separation of carbon dioxide is roughly divided into an absorption method, an adsorption method, a membrane separation method and a distillation method. The absorption method is further divided into a physical absorption method and a chemical absorption method.

The physical absorption method is a method wherein carbon dioxide is caused to be absorbed by a solution by means of physical combination. Water, methanol, N-methyl pyrolidone, polyethylene glycol dimethyl ether, oligoethylene glycol methyl isopropyl ether, propylene carbonate or the like is used as an absorption liquid.

The chemical absorption method is a method wherein carbon dioxide is absorbed by means of chemical reaction. This method is divided into an alkanol amine method, an amisol, sulfinol and a thermal potassium carbonate method, alkatit method and an aqueous ammonia washing method. The alkanolamine method among those methods is a process wherein an aqueous solution of amine is used as the absorption liquid and many examples wherein this process is used can be pointed out. An absorption reaction formula in the alkanolamine method is as follows:

$$R-NH_2 + H_2O + CO_2 \rightleftharpoons R-NH_3HCO_3$$

The adsorption method is a method wherein carbon dioxide is removed by contacting an adsorption agent such as zeolite, activated charcoal or molecular sieving carbon to a mixture of gases. The adsorption method is divided into a thermal swing adsorption method wherein a difference in adsorbed amounts is utilized depending on a difference in temperatures according to methods for generating adsorption agents and a pressure swing adsorption method wherein a difference in adsorbed amounts is utilized depending on a difference in pressures.

The membrane separation method is a method for separating carbon dioxide by using a cellulose acetate membrane, a polysulfonic membrane, an aromatic polyamide membrane or the like.

The prism separator is used for recovery of carbon dioxide in a separation of carbon dioxide from natural gas and an enhancement oil recovery.

The above-described apparatus shows a case where it is installed in a permafrost region. The structure of an apparatus used for the case of the presence of hydrate of natural gas in the ground of the sea bottom is the same as that of the above-described apparatus.

When the apparatus is used for the case of the presence of hydrate of natural gas in the ground of the sea bottom, dumped carbon dioxide gas in the storage tank 208 is sent to the lower portion of the pressure injection pipe 203, being pressurized by the pressure injection apparatus 206, and exhausted from the exhaust ports 205 into hydrate of natural gas surrounding the exhaust ports. The dumped carbon dioxide 215 heats the hydrate of natural gas 202 around the exhaust ports 205. The carbon dioxide gas itself is cooled by the hydrate of natural gas and converts to gas hydrate of carbon dioxide gas. Natural gas is dissociated from the hydrate of natural gas. When the dumped carbon dioxide gas 215 converts to the gas hydrate of carbon dioxide, the dumped carbon dioxide releases latent heat, which is used for heating the hydrate of natural gas to dissociate natural gas from the hydrate of natural gas. The hydrate of natural gas is replaced by the gas hydrate of carbon dioxide and natural gas is released for recovery.

Natural gas generated in this way is mixed with some remaining carbon dioxide gas whereby a mixed gas 216 of natural gas and carbon dioxide gas is generated. The mixed gas 216 goes from the gas inlet port 211 into the gathering pipe 209 and attains the gas separator 212, rising in the gathering pipe 209. The mixed gas 216 is divided into natural gas 217 and carbon dioxide gas 218 by using the gas separator 212. The natural gas 217 is sent to a gas holder (not shown) via the pipe 213. The carbon dioxide gas 218 goes into the storage tank 218 via the pipe 214 and is mixed with the dumped carbon dioxide.

Figure 9:
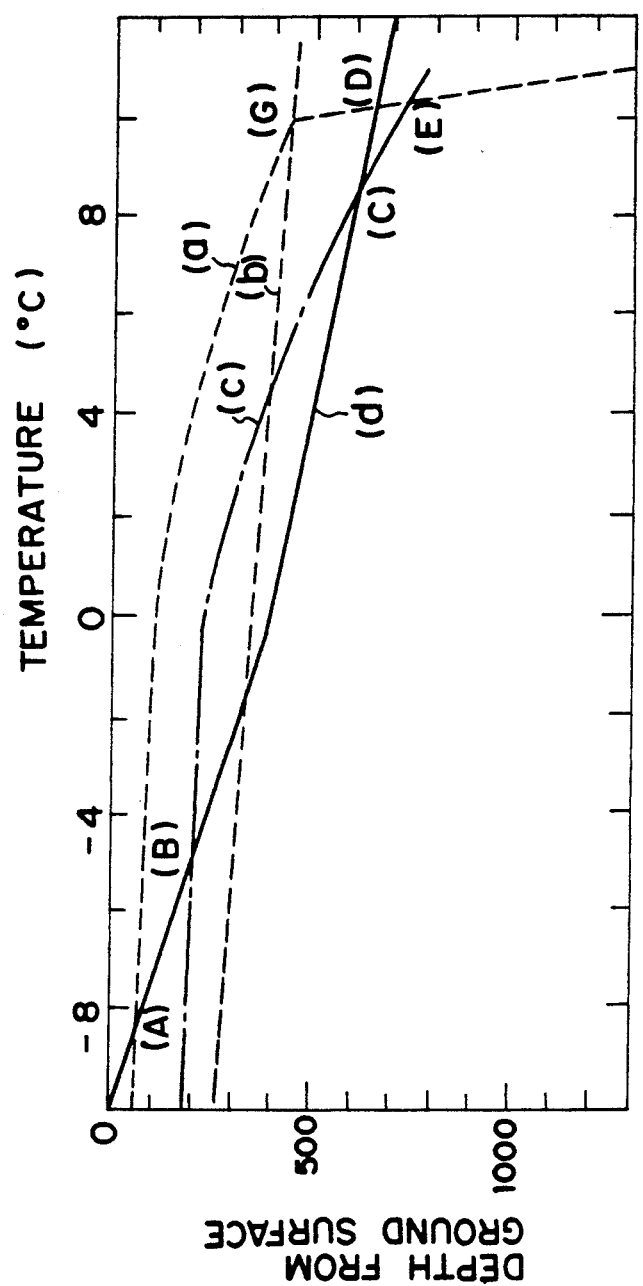
FIG. 9 is a graphical representation showing a distribution of temperatures of the grounds in a cold district and conditions, under which gas hydrate of carbon dioxide and methane are formed relative to the present invention.

FIG. 9 is a graphic representation showing a distribution of temperatures of the ground in a permafrost region and conditions of forming of gas hydrate of carbon dioxide and gas hydrate of methane gas. The solid curve of symbol "d" denotes an example of a vertical distribution of temperatures of the ground in a permafrost region. The dashed curve of symbol "a" denotes a coexistence curve (a dissociation pressure curve of gas hydrate of carbon dioxide) of carbon dioxide gas, gas hydrate and water or ice. The dashed curve of symbol "b" denotes a coexistence line of liquefied carbon dioxide gas, gas hydrate and carbon dioxide gas. The alternate long and short dash curve of symbol "c" denotes a dissociation curve of gas hydrate of methane. Any of the gas hydrates is stably present at the depths of the ground deeper than the coexistence curve or the dissociation curve. The gas hydrate of carbon dioxide can be present at the depth between A and D and the gas hydrate of methane between B and C. Since the vertical distribution of temperatures of the ground depends on temperatures on the surface of the earth and a flow amount of geothermal energy both of which are determined by climate conditions, the vertical distribution of temperatures differs depending on places. In consequence, the depths of the ground where the gas hydrate of carbon dioxide and the gas hydrate of methane gas can be present also differ depending on places.

Figure 10:
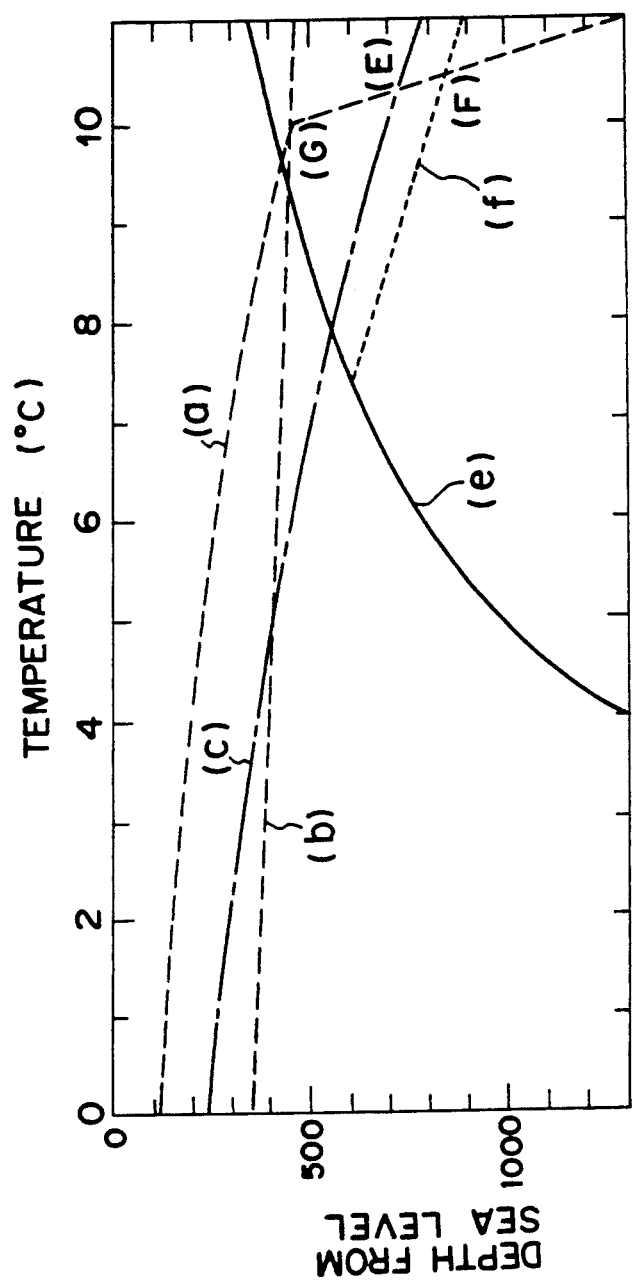
FIG. 10 is a graphical representation showing a vertical distribution of temperatures of the grounds of the sea bottom and conditions, under which gas hydrate of carbon dioxide and methane are formed relative to the present invention.

FIG. 10 is a graphical representation showing a vertical distribution of temperatures of the ground at the sea bottom and conditions of formation of gas hydrate of carbon dioxide and gas hydrate of methane. The solid curve of symbol "e" denotes a vertical distribution of temperatures of water. The dashed curve of symbol "a" denotes a coexistence curve of carbon dioxide gas, gas hydrate and water or ice. The dashed curve of symbol "b" denotes a coexistence curve of liquefied carbon dioxide gas, gas hydrate and carbon dioxide gas. The alternate long and short dash curve "c" is a dissociation curve of gas hydrate of methane. For example, the distribution of temperatures in the ground at the sea bottom at a depth of water of 600 meters is shown with the dash curve of symbol "f".

It is understood from this drawing that the gas hydrate of carbon dioxide and the gas hydrate of methane are present in the ground at the sea bottom.

A dissociation temperature of gas hydrate of carbon dioxide is higher than that of gas hydrate of methane within the range of the depth smaller than point E in FIGS. 9 and 10. For example, the dissociation temperature of gas hydrate of methane is about 8.7° C. at a depth of 600 meters and the dissociation temperature of gas hydrate of carbon dioxide is about 10.2° C.

Accordingly, when carbon dioxide gas is injected into layers of hydrate of natural gas, the carbon dioxide gas is fixed as gas hydrate.

When dumped carbon dioxide gas is injected into layers of hydrate of natural gas under pressure, the carbon dioxide heats the hydrate of natural gas and the temperature of the carbon dioxide gas itself lowers gradually. When the temperature of the carbon dioxide is lowered to the dissociation temperature at a depth of pressure injection (at the pressure at a position of injection), the carbon dioxide converts to gas hydrate of carbon dioxide. During conversion of carbon dioxide to the gas hydrate of carbon dioxide, the carbon dioxide releases latent heat. The latent heat released during formation of 1 kg of gas hydrate of carbon dioxide is 97.6 kcal for carbon dioxide gas and 49.5 kcal for liquefied carbon dioxide gas. After the change of phases, the temperature of gas hydrate of carbon dioxide lowers again and lowers to the temperature of hydrate of natural gas. On the other hand, natural gas is dissociated and released from the layers of hydrate of natural gas by sensible heat and latent heat of the carbon dioxide. If a gathering pipe for gathering natural gas is placed in such a place, natural gas can be gathered.

Layers of hydrate of natural gas of a temperature of $\theta_{ng}$ are now considered. A quantity of heat which heats the layers of hydrate of natural gas when 1 m$^3$ of seawater of a temperature of $\theta$ is injected under pressure into the layers of hydrate of natural gas is compared with a quantity of heat which heats the hydrate of natural gas when 1 m$^3$ of carbon dioxide of a temperature of $\theta$ is injected into the layers of hydrate of natural gas. The quantity $q_{sw}$ of heat of the seawater is represented with the following formula:

$$q_{sw} = \rho_{sw} C_{psw}(\theta - \theta_{nx}) \tag{1}$$

The quantity $q_{co2}$ of heat of the carbon dioxide is represented with the following formula:

$$q_{co2} = \rho_{co2}\{C_{psw}(\theta - \theta_d) + L_b + C_{pH}(\theta_d - \theta_{ng})\} \tag{2}$$

where $\rho$: density, $C_p$: isopiestic specific heat, $\theta_d$: dissociation temperature of gas hydrate of carbon dioxide, $L_h$: latent heat of dissociation. The subscripts $_{sw}$, $_{co2}$ and $_h$ indicate seawater, carbon dioxide and gas hydrate of carbon dioxide, respectively.

Figure 11:
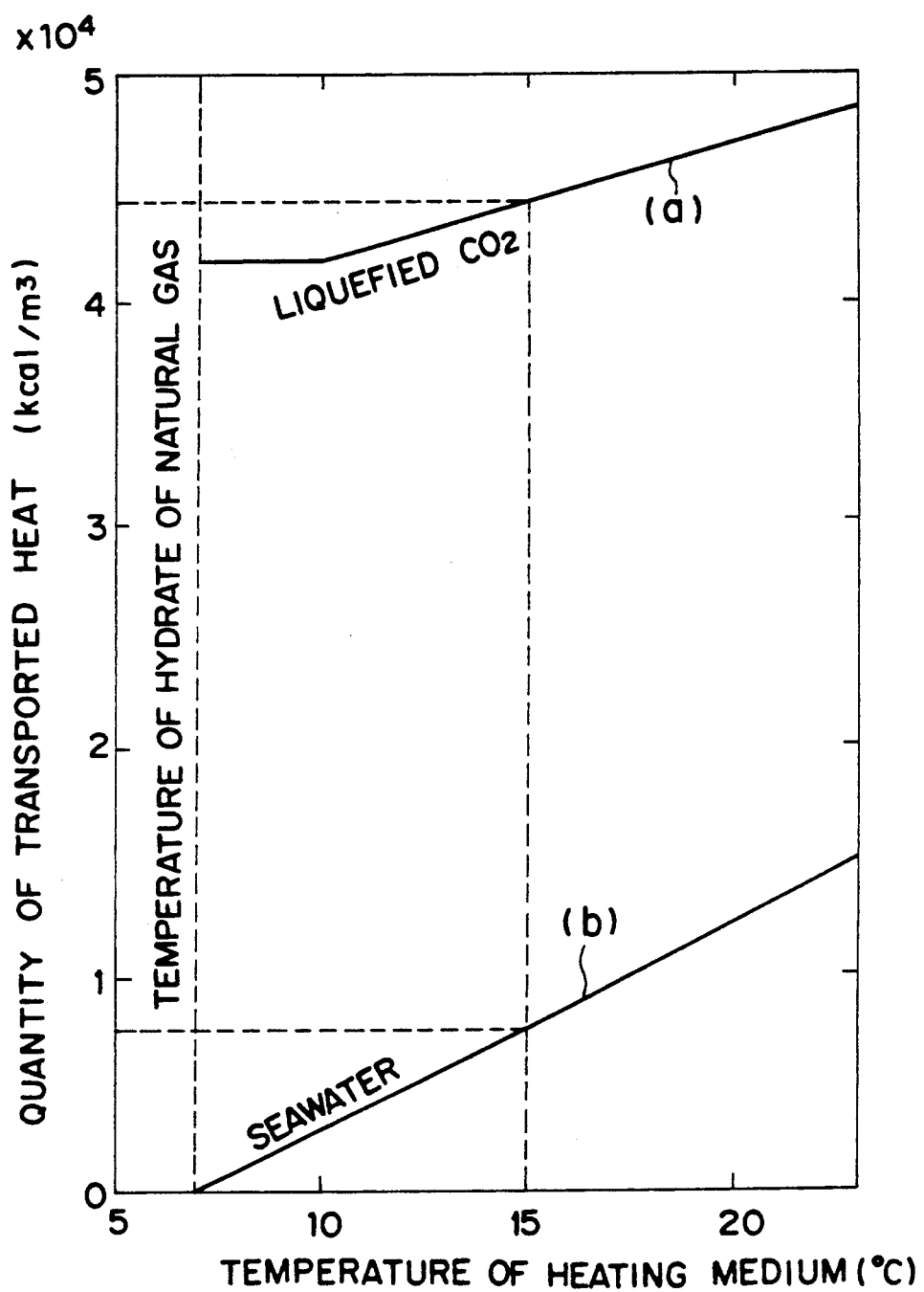
FIG. 11 is a graphical representation showing a comparison of the case where seawater at different temperature is injected into layers of hydrate of natural gas present in the ground of the sea bottom of 7° C. at a depth of 600 m with the case where carbon dioxide at different temperatures is injected into the above-mentioned layers.
Figure 12:
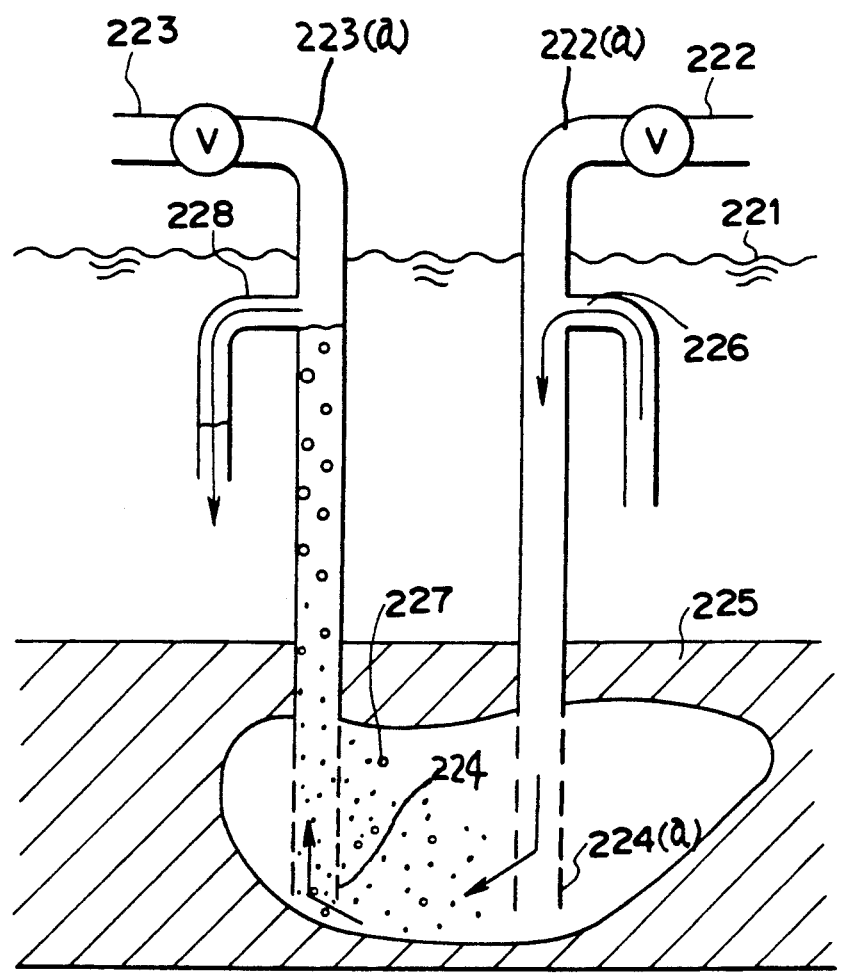
FIG. 12 is a schematic illustration showing the prior art apparatus wherein natural gas is gathered by injecting seawater under pressure into layers of hydrate of natural gas.
Figure 13:
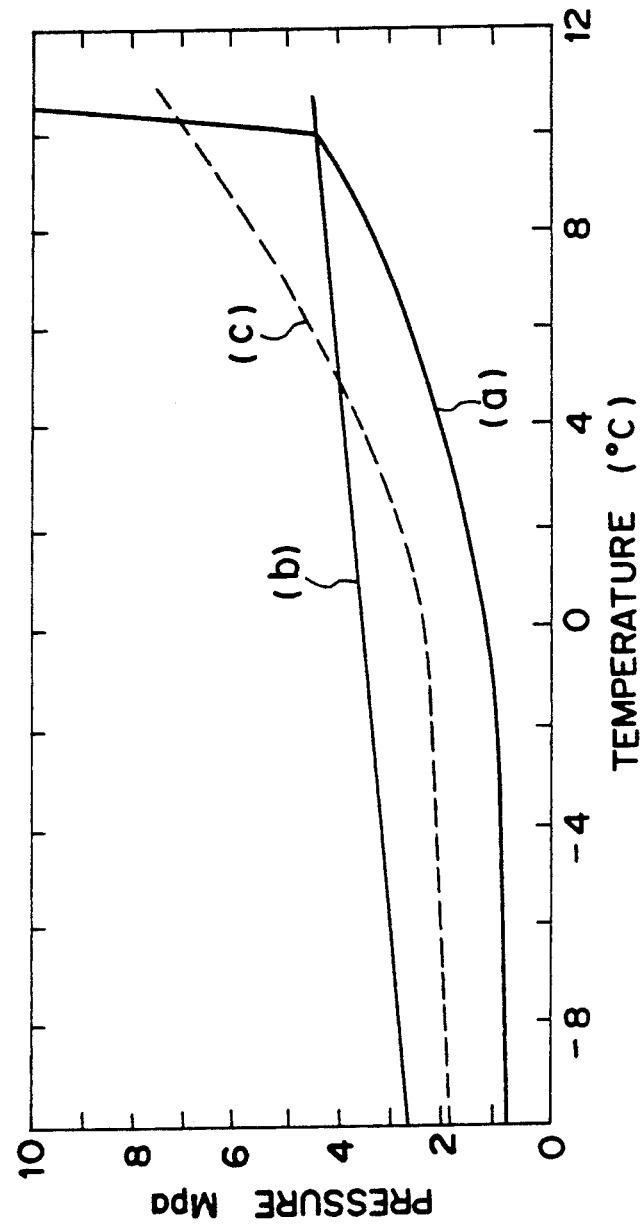
FIG. 13 is a graphical representation showing the relationship between the temperatures and the dissociaton pressures of gas hydrate relative to methane as a main component of natural gas and carbon dioxide.

FIG. 11 is a graphical representation showing a quantity of transported heat of seawater or carbon dioxide in the case of injecting seawater of a temperature of $\theta$ or carbon dioxide of a temperature of $\theta$ into the layers of hydrate of natural gas present in the ground of the sea bottom at a depth of 600 meters. The carbon dioxide is already liquefied under this condition. The dissociation temperature of the gas hydrate of carbon dioxide is 10.2° C. In the drawing, symbol "a" denotes a curve showing the quantity of transported heat of carbon dioxide and symbol "b" denotes a curve showing the quantity of transported heat of the seawater.

It is understood from this graphical representation that the quantity of transported heat of carbon dioxide is larger than that of the seawater. For example, when the case where a temperature of each of seawater and carbon dioxide injected under pressure is 15° C. is observed, the quantity of transported heat of the carbon dioxide is 5.7 times larger than that of the seawater.

As described above, in the case of injecting carbon dioxide under pressure, latent heat released from forming gas hydrate of carbon dioxide can be used for heating hydrate of natural gas and more hydrate of natural gas can be dissociated.

When carbon dioxide is injected under pressure into layers of hydrate of natural gas which are formed at a depth of less than 750 meters or in the ground with a load of 7.5 MPa or less (at a depth of shallower than E point in FIGS. 9 and 10), the latent heat during formation of gas hydrate of carbon dioxide can be used for heating hydrate of natural gas. When carbon dioxide is injected under pressure into layers of hydrate of natural gas which are formed at a depth of more than 750 meters (for example, at a depth of deeper than E point in FIG. 9), gas hydrate of carbon dioxide is not always formed and carbon dioxide cannot be fixed.

When the temperature of carbon dioxide injected under pressure is lower than the dissociation temperature of gas hydrate of carbon dioxide at a depth wherein carbon dioxide is injected under pressure, gas hydrate is formed in a supercooling state of carbon dioxide. In this case, some of the latent heat released during formation of gas hydrate breaks the supercooling of dumped carbon dioxide and is spent in order that the temperature of carbon dioxide can be elevated to the dissociation temperature. This is not desirable because a dissociated quantity of hydrate of natural gas decreases. This problem can be solved by injecting carbon dioxide of 10° C. or more under pressure.

When the layers of hydrate of natural gas are crushed, a porosity of the layers is increased whereby heat exchange of carbon dioxide injected under pressure with hydrate of natural gas is promoted.

According to the present invention, the following effect can be obtained:

① Dumped carbon dioxide is fixed in the ground as gas hydrate of carbon dioxide, and natural gas dissociated from hydrate of natural gas can be gathered.

② Natural gas can be gathered by means of ①, and the costs of dumping carbon dioxide according to the method of the present invention can be decreased in comparison with those in the prior art method.

③ According to the method of the present invention, latent heat generated during conversion of dumped carbon dioxide to gas hydrate of carbon dioxide can be utilized, which is more advantageous than the prior art method wherein natural gas is gathered by using only sensible heat of seawater.

What is claimed is:

1. A method for dumping carbon dioxide gas into ground of sea bottom, comprising the steps of:
   boring a well in the ground of the sea bottom;
   setting a carbon dioxide injecting pipe in said well; and injecting the carbon dioxide gas into the ground of the sea bottom under condition where the carbon dioxide gas contacts sea water penetrated into the ground to produce a gas hydrate of carbon dioxide to fix the carbon dioxide gas, the gas hydrate of carbon dioxide being caused to reside in the ground of the sea bottom.

2. An apparatus for gathering natural gas by using carbon dioxide gas as a heat generating source, comprising:
   an injection pipe for injecting carbon dioxide, said pipe having an outlet operable to be disposed in or below layers of hydrate of natural gas;
   a pressure injection apparatus for injecting carbon dioxide under pressure through said injection pipe and out of said outlet;
   a gathering pipe for gathering a mixed gas containing natural gas separated from the layers of hydrate of natural gas and carbon dioxide; and
   a gas separator for separating natural gas from the gathered mixed gas.

3. A method for dumping carbon dioxide gas into ground of sea bottom comprising the steps of:
   boring a well in the ground of the sea bottom;
   setting a carbon dioxide injecting pipe in said well; and
   injecting the carbon dioxide gas into the ground of the sea bottom deeper than a depth where the carbon dioxide gas contacts sea water penetrated into the ground and is converted to a gas hydrate of carbon dioxide to fix the carbon dioxide gas, the carbon dioxide gas being blocked by the gas hydrate formed above the carbon dioxide gas thereby being restrained to reside in the ground of the sea bottom.

4. A method for dumping carbon dioxide gas into ground of sea bottom comprising the steps of:
   boring a well in the ground of the sea bottom through an impermeable layer;
   setting a carbon dioxide injecting pipe in said well; and injecting the carbon dioxide gas into the ground of the sea bottom deeper than the impermeable layer to fix the carbon dioxide gas by restraining it to reside under the impermeable layer.

5. A method for dumping carbon dioxide gas into ground of a cold district of high latitude having a permafrost comprising the steps of:
   boring a well in the ground of the cold district of high latitude; and
   injecting the carbon dioxide gas through the well into the ground of the cold district under conditions where the carbon dioxide gas is converted to a gas hydrate of carbon dioxide in the ground of the cold district.

6. A method for dumping carbon dioxide into the ground of a cold district of high latitude having a permafrost, comprising the steps of:
   boring a well in the ground of the cold district of high latitude; and
   injecting the carbon dioxide through the well into the ground of the cold district deeper than a depth where carbon dioxide gas is converted to a gas hydrate of carbon dioxide.

7. A method for dumping carbon dioxide gas into ground of a cold district of high latitude having a permafrost comprising the steps of:
   boring a well in the ground of the cold district of high latitude; and
   injecting the carbon dioxide gas into voids formed by melting the permafrost surrounding the well 8. A method for gathering natural gas by using dumped carbon dioxide gas as a heat generating source, comprising the steps of:
   injecting one selected from the group consisting of the carbon dioxide gas and liquefied carbon dioxide gas into layers of hydrate of natural gas existing in the ground of the sea bottom; and
   dissociating the natural gas from the layers of the hydrate of the natural gas by sensible heat of the carbon dioxide and latent heat, the latent heat being produced when the carbon dioxide gas is converted to a gas hydrate of carbon dioxide; and
   pumping up the dissociated natural gas to sea surface 9. The method of claim 8, wherein the layers of the hydrate of the natural gas exists at a depth of 750 meters or less under the sea surface.

10. The method of claim 8, wherein a temperature of the dumped carbon dioxide gas is 10° C. or more.

11. A method for gathering natural gas by using dumped carbon dioxide gas as a heat generating source comprising the steps of:
   injecting one selected from the group consisting of the carbon dioxide gas or liquefied carbon dioxide gas, into layers of hydrate of natural gas existing in permafrost region of a cold district; and
   dissociating the natural gas from the layers of the hydrate of the natural gas by sensible heat of the carbon dioxide and latent heat, the latent heat being produced when the carbon dioxide gas is converted to a gas hydrate of the carbon dioxide; and
   pumping up the dissociated natural gas to ground surface.

12. The method of claim 11, wherein the layers of the hydrate of the natural gas exists in a ground with a load of 7.5 Mpa.

13. The method of claim 12, wherein a temperature of the dumped carbon dioxide gas is 10° C. or more.

* * * * *